(12) United States Patent
Jackson et al.

(10) Patent No.: US 6,661,505 B2
(45) Date of Patent: Dec. 9, 2003

(54) METHOD AND SYSTEM FOR MEASURING CASTER TRAIL

(75) Inventors: David A. Jackson, Point Roberts, WA (US); Stephen L. Glickman, Los Gatos, CA (US); James L. Dale, Jr., Conway, AR (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 10/307,444

(22) Filed: Dec. 2, 2002

(65) Prior Publication Data

US 2003/0142294 A1 Jul. 31, 2003

Related U.S. Application Data

(63) Continuation-in-part of application No. 09/892,722, filed on Jun. 28, 2001, now Pat. No. 6,532,062.

(51) Int. Cl.$^7$ .......................... G01B 11/26; G01B 21/22; G01B 13/18
(52) U.S. Cl. ............... 356/139.09; 33/203.12; 33/203.13; 33/203.18
(58) Field of Search ................... 33/203.12, 203.13, 33/203.18; 356/139.09

(56) References Cited

U.S. PATENT DOCUMENTS

| | | | | |
|---|---|---|---|---|
| 3,793,734 A | * | 2/1974 | Merrill | 33/203.12 |
| 4,479,382 A | * | 10/1984 | Greenhorn et al. | |
| 4,643,578 A | | 2/1987 | Stern | |
| 5,090,235 A | * | 2/1992 | Hirano et al. | |
| 5,257,458 A | * | 11/1993 | Koerner | 33/203.12 |
| 5,291,660 A | * | 3/1994 | Koerner | 33/203.12 |
| 5,351,985 A | * | 10/1994 | Ando et al. | |
| 5,535,522 A | | 7/1996 | Jackson | |
| 5,724,128 A | | 3/1998 | January | |
| 5,724,129 A | | 3/1998 | Matteucci | |
| 5,809,658 A | | 9/1998 | Jackson et al. | |
| 5,943,783 A | | 8/1999 | Jackson | |
| 5,969,246 A | * | 10/1999 | Jackson et al. | 33/203.18 |
| 6,134,792 A | | 10/2000 | January | |
| 6,148,528 A | | 11/2000 | Jackson | |
| 6,532,062 B2 | * | 3/2003 | Jackson et al. | |

FOREIGN PATENT DOCUMENTS

| | | |
|---|---|---|
| FR | 2735861 A | 6/1995 |
| GB | 2283 090 A | 4/1995 |
| WO | WO 93/07443 | 4/1993 |
| WO | WO 98/48241 | 10/1998 |
| WO | WO01/23834 | 5/2001 |

OTHER PUBLICATIONS

Ofria, *A short course on Wheel Alighment*, 2000, 12 pages.
Chek–Chart Publications, *Wheel Balance and Alignment*, 1999, pp. 329–359.
Hunter Engineering Company, *Series 311 Upgradeable Computerized Wheel Alignment System*, 1999, 2 pages.
Hunter Engineering Company, *DSP 400 Alignment Sensors*, 2000, 4 pages.
Hunter Engineering Company, *Upgrade your Series 211 or 411 Alignment System to the new State–of–the–Art Series 611*, 1999, 2 pages.
Hunter Engineering Company, *Series 611 Computerized Wheel Alignment System*, 2000, 16 pages.
Hunter Engineering Company, *DSP250& 300 Series Sensors for Hunter Computerized Wheel Alignment Systems*, 2000, 2 pages.

* cited by examiner

*Primary Examiner*—Stephen C. Buczinski
(74) *Attorney, Agent, or Firm*—McDermott, Will & Emery (57) ABSTRACT

A system for measuring caster trail of a wheel. The system comprises position sensing devices for sensing positional signals of the wheel and a data processing system configured to couple to the position sensing devices. The data processing system receives signals from the position sensing devices and determines spatial characteristics of a steering axis of the wheel, a reference plane and the center of a wheel. The system then determines the caster trail based on the spatial characteristics.

72 Claims, 7 Drawing Sheets

METHOD AND SYSTEM FOR MEASURING CASTER TRAIL

This application is a continuation-in-part of patent application Ser. No. 09/892,722, filed on Jan. 28, 2001 now U.S Pat. No. 6,532,062 by Jackson et al. and titled "METHOD AND APPARATUS FOR MEASURING VEHICLE WHEEL SCRUB RADIUS," the entirety of which is incorporated herein by reference.

FIELD OF THE DISCLOSURE

The present disclosure generally relates to vehicle service equipment and methodology and, more specifically, to system and method for measuring caster trail of a vehicle.

BACKGROUND OF THE DISCLOSURE

It is important to ensure that parameters related to the steering system and/or wheels of a vehicle are within specifications provided by vehicle manufacturers. If the parameters do not match with the values specified in the specifications, there may be excessive or uneven wear on the wheels. In addition, the performance of the vehicle, particularly handling and stability, may be adversely affected.

During vehicle service, various ways and systems are used to determine parameters related to the steering system and/or wheels of a vehicle. For example, during alignment of an automotive vehicle, a vision imaging system having optical sensing devices, such as cameras, may be used to determine the positions or positional characteristics of various objects on the vehicle and/or to obtain positional and angular orientation information about the vehicle. The information includes toe angles, caster values, camber angles, frame symmetries, etc.

Figure 1:
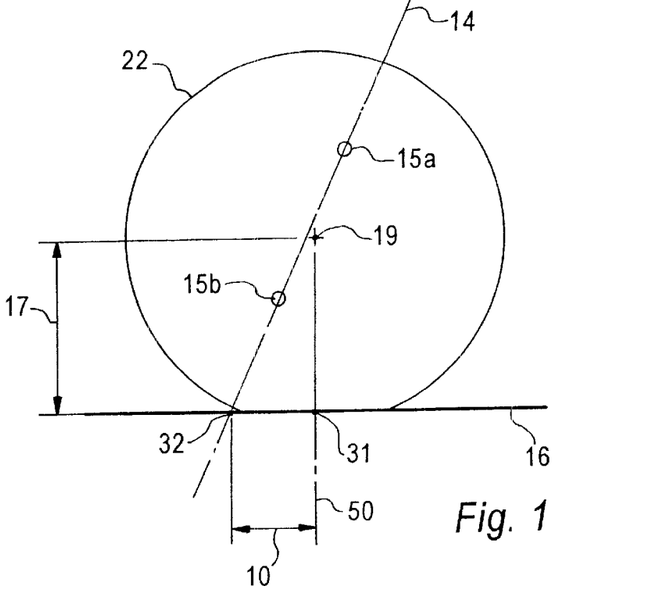
FIG. 1 is a side view of a steerable wheel of a vehicle.

However, it has been found that conventional position determination systems are not able to provide readings of certain parameters, such as caster trail. The definition of caster trail is illustrated in FIG. 1. FIG. 1 shows a side view of a steerable wheel of a vehicle. The steering axis 14 passes through steering pivots 15*a* and 15*b* of the wheel 22. Caster trail 10 is defined as the distance between the intersection of a steering axis 14 of the wheel 22 and a ground plane 16, and the intersection of side centerline 50 and the ground plane 16, as viewed from the side of the vehicle. The side centerline 50 is a line normal to the reference plane 16 and passing through the wheel center 19. Alternatively, although less commonly used, caster trail can also be defined as the fore and after distance between the center of the wheel and the intersection of the steering axis 14 with a reference plane that is at the height of the wheel center 19 and parallel to the ground plane 16.

If a vehicle's caster trail does not match up with a manufacturer's specifications, the mismatch may be an indication of mis-adjustment or damage to the vehicle's suspension and/or steering system. Therefore, there is a need for a system and method for measuring the caster trail of the wheels on a vehicle. There is also a need to determine whether the measured caster trail of a vehicle matches the specifications provided by vehicle makers.

SUMMARY OF THE DISCLOSURE

An exemplary system for determining caster trail includes a data processing system, such as a computer, and position sensing devices for obtaining positional signals representing positional parameters of the wheel. The wheel center may be determined based on the wheel axis, the spindle, the contact patch, or other elements that can be used to determine the position of the wheel center.

The data processing system then determines a projection of the wheel center on the reference plane, and an intersection of the reference plane and the steering axis or an extension thereof. The system then determines the caster trail based on distance between the projection of the wheel center on the reference plane and the intersection.

The position sensing devices may include optical imaging devices or weight sensing devices or any other types of devices that are well known to people skilled in the art to obtain positional parameters of objects. Optical sensing devices may include video cameras, light sensors, and/or the like. The optical sensing devices form a viewing path with the wheel directly or with a target attached to the wheel. The weight sensing devices may include gravity gauges mounted to the wheel.

The reference plane is chosen based on the definition of the caster trail and preference of system design. For example, the reference plane may be set as the plane on which the wheel is positioned, a plane passing the wheel center and parallel to the plane on which the wheel is positioned, or any other plane that can be used to derive the caster trail.

The data processing system includes a data storage device, such as a hard disk drive, that includes instructions upon execution by a data processor in the data processing system to cause the data processing system to perform programmed functions.

In one aspect, the system determines caster trail based on well-known parameters related to the steering axis, such as caster values. According to a further aspect, the system may access a database including specifications of caster trail of the vehicle under test. The system may determine whether the calculated caster trail is within certain margin of the specifications. Furthermore, the system may obtain scrub radius of the wheel and compare with scrub radius specifications. Optionally, a graphical and/or numeric screen showing measurement results and specifications may be presented to the operator of the system to assist determination of the operational status of the wheel.

Described also is a machine-readable medium carrying one or more sequences of instructions which, when executed by at least one processor, cause the processor to determine caster trail based on positional characteristics of a steering axis of the wheel, a reference plane and a wheel center.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION OF THE DISCLOSURE

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Methods for Determining Caster Trail

As shown in FIG. 1, caster trail 10 of a vehicle is defined as the distance between the intersection 32 of a steering axis 14 and a ground plane 16, and the intersection 31 of the side center line 50 and the reference plane 16, as viewed from the side of the vehicle. An exemplary method for determining the caster trail of a vehicle is now described. In order to determine the caster trail of a vehicle, the spatial characteristics of the steering axis 14, the wheel center 19 and a reference surface, such as the ground surface 16 in FIG. 1, needs to be determined.

Figure 2:
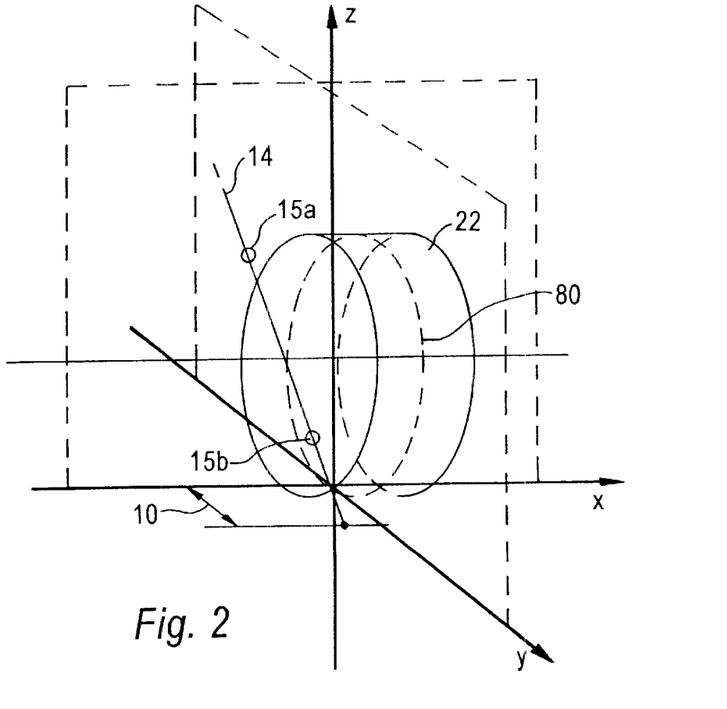
FIG. 2 is a perspective view of the same wheel shown in FIG. 1.

FIG. 2 is a perspective view of the same wheel shown in FIG. 1. The wheel center 19 may be determined based on the wheel axis, the spindle, the contact patch, or other elements that has a spatial relationship with the wheel center. For example, the wheel center is where the wheel axis intersects the wheel's plane, as defined by the tire centerline 80. The spatial characteristics of the tire centerline 80 can be obtained based on the width of rim on which the tire is mounted. For instance, the relative position of the tire centerline 80 is the outer side surface of the wheel offset by half of the width of the rim. Information related to the width of the rim can be obtained by accessing a database, entered by a technician or from specifications, or measured by a position sensing devices, such as a camera.

After the spatial characteristics of the steering axis 14, the wheel center and a reference surface 16 is determined, a Cartesian coordinate system having three axes, x, y and z, is set for determining the caster trail, wherein the x-y plane is set as the ground surface 16, and the origin of the coordinate system is set as the projection of the wheel center 19 on the y-axis. As seen in FIG. 2, the caster trail is the distance between the origin and the y-axis projection of the intersection of the steering axis 14 and the ground surface 16.

The y-axis projection of the intersection of the steering axis 14 and the ground surface 16 can be determined by obtaining the caster value of the wheel. Caster is the angle of the steering axis 14, viewed from the side of the vehicle, relative to the tire's vertical centerline, which is the z-axis. Thus, when the caster value of the wheel is determined, a vector V representing the projection of the steering axis 14 on the y-z plane can be determined, just as the steering axis 14 shown in FIG. 1. Once the vector V is determined, the intersection 32 of vector V and the y-axis can be determined. The distance between the intersection 32 and the origin of the coordinate system is the caster trail.

An exemplary system implementing the above methodology to determine the caster trail of a vehicle is described below.

System Overview

Figure 3:
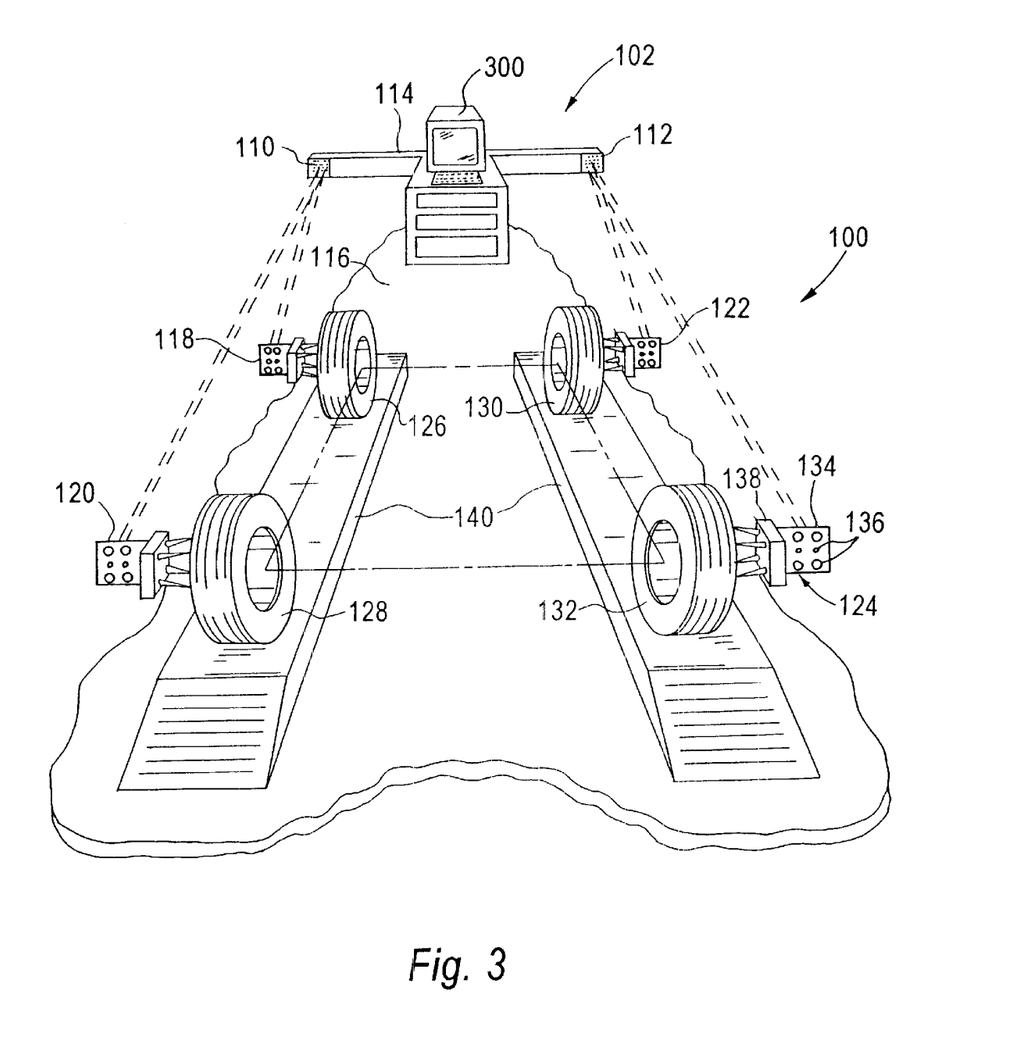
FIG. 3 shows an exemplary system for determining caster trail.

FIG. 3 shows an exemplary system 100 for determining caster trail. The system 100 includes a data processing system 300 and a position sensing system 102 having a pair of fixed, spaced-apart position sensing devices, such as cameras 110,112, mounted on a beam 114. The position sensing devices are used for sensing positions or positional characteristics of the vehicle or targets attached to the vehicle and generating positional signals accordingly. Other position sensing devices, such as light sensors or the like may also be used depending on system design and/or targets used in the system.

The beam 114 has a length sufficient to position the cameras 110,112 respectively outboard of the sides of the vehicle to be imaged. Also, the beam 114 positions the cameras 110,112 high enough above the shop floor 116 to ensure that the two targets 118,120 on the left side of the vehicle are both within the field of view of the left side camera 110, and two targets 122,124 on the right side of the vehicle are both within the field of view of the right side camera 112.

A vehicle under test is driven onto a lift 140. Targets 118,120,122, 124 are mounted on each of the wheels 126, 128,130,132 of the vehicle, with each target 118,120,122, 124 including a target body 134, target elements 136, and an attachment apparatus 138. The attachment apparatus 138 attaches the target 118, 120,122,124 to wheel 126,128,130, 132. An example of an attachment apparatus is described in U.S. Pat. No. 5,024,001, entitled "Wheel Alignment Rim Clamp Claw" issued to Borner et al. on Jun. 18,1991, incorporated herein by reference. Others could be used. The target elements 136 are positioned on the target body 134.

The targets 118,120,122,124, once attached to the wheel rims, are then oriented so that the target elements 136 on the target body 134 face the respective cameras 110,112. The vehicle and model year can then entered into the vision imaging system 102 along with other identifying parameters, such as vehicle VIN number, license number, owner name, etc.

The location of the targets 118,120,122,124 relative to the rim of the wheels 126,128,130,132 to which the targets are attached are typically known to an accuracy of about 0.01 ' and about 0.01 0°. Once the targets 118,120,122,124 have been imaged in one position, the wheels 126,128,130,132 are rolled to another position and a new image can be taken. Using the imaged location of the targets 118,120,122,124 in the two positions, the actual position and orientation of the wheels 126,128,130,132 and wheel axis can be calculated by the vision imaging system 102. Although the distance between the two positions varies, the distance is often approximately 8 inches.

The data processing system 300, such as a personal computer, is coupled to cameras 110,112 to receive target positional signals obtained thereby. In one embodiment, a mathematical representation, or data corresponding to a true image (i.e. an image taken by viewing the target device perpendicularly to its primary plane) and the dimensions of targets are preprogrammed into the memory of the data processing system 300 so that, during the measurement process, the data processing system 300 has a reference image to which the viewed perspective images of the targets can be compared.

Other details of using optical imaging devices to determine positional parameters are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996, both of which are assigned to the same assignee of the current application and are incorporated herein by reference in their entireties.

Figure 4:
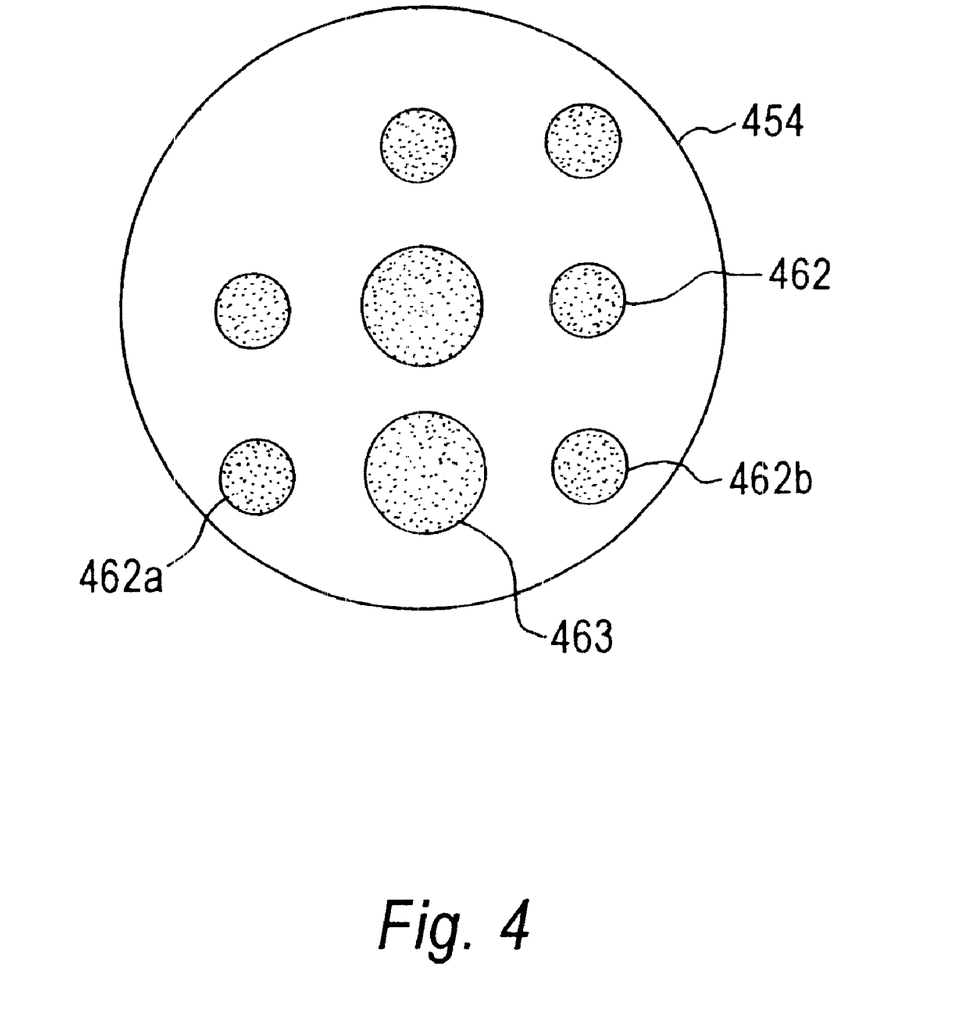
FIG. 4 shows an exemplary target that can be used in the position determination system.

FIG. 4 shows an exemplary target that can be used in the position determination system. Data processing system 300 calculates the orientation of the targets by identifying certain geometric characteristics on the targets. For example, data processing system 300 may calculate the center of each of the circles 462a, 462b on target 454 by means of centroiding. This is a method commonly used by image analysis computers to determine the positioning of the center point or centerline of an object. Once the center points of the two circles 462a, 462b have been determined, the distance between the two can be measured. This process is then repeated for other circles in the pattern on the targets 454. These distances can then be compared to the true distances (i.e. non-perspective distances) between the respective centers. Similarly, the angle to the horizontal (or vertical) of the line joining the two centers can be determined. A calculation can then be made as to the orientations of the targets. The data processing system 300 takes perspective measurements and compares these measurements with the true image previously pre-programmed into the memory of data processing system 300.

The exemplary system 100 may also use other types of position sensing devices that are well known to persons skilled in the art to obtain signals related to positional parameters of the vehicle. The signals are then processed by the data processing system 300. Examples of such position sensing devices include using a gravity-referenced inclinometer or alignment head, which is mounted to a vehicle wheel for measuring the alignment parameters. Descriptions of systems used to determine positional parameters can be found in U.S. Pat. No. 4,761,749, entitled "Vehicle Wheel Alignment Apparatus and Method," issued to Titsworth, et al. on Aug. 2 ,1988; U.S. Pat. No. 5,519,488, entitled "Eight Sensor Wheel Aligner," issued to Dale, Jr., et al. on May 21,1996; and U.S. Pat. No. 5,531,030, entitled "Self-calibrating Wheel Alignment Apparatus and Method," issued to Dale, Jr., et al. on Jul. 2, 1996, all of which are incorporated herein by reference.

In another embodiment, the system 100 uses position sensing devices that obtain positional signals of a vehicle without contacting the vehicle. No target, head or even stick is attached to the vehicle during the measurement process. Examples of position determination systems using non-contact position sensing devices are described in U.S. Pat. No. 4,745,469, entitled "Vehicle Wheel Alignment Apparatus and Method," issued to Waldeker, et al. on May 17, 1988, and U.S. Pat. No. 4,899,218, entitled "Vehicle Wheel Alignment Apparatus and Method," issued to Waldeker, et al. on Feb. 6, 1990, both of which are incorporated herein by reference.

Other methods and devices that are well known to people skilled in the art to obtain signals representing positional parameters of a vehicle can also be implemented in the system 100 depending on design preference. If desirable, various position sensing devices and/or methods can be used together in the system 100 in order to obtain positional parameters of the vehicle under test.

Determination of Caster Trail

As discussed earlier, in order to determine caster trail, the exemplary system 100 determines the relative spatial characteristics of the steering axis, the reference surface and the wheel center. The exemplary system 100 also sets up a Cartesian coordinate system as described in FIG. 2 to calculate the value of caster trail.

(1) Determination of the Spatial Characteristics of the Wheel Center

The exemplary system 100 determines the intersection of the side centerline 50 and the ground plane 16 based on the wheel center 19. The system 100 may use various ways to determine positional characteristics related to the wheel center, such as determining the spatial parameters of the wheel axis, the spindle or the contact patch or the like.

In FIG. 3, the vehicle under test is positioned on the lift 140, which is raised to allow the technician to perform the measurement. Targets 118,120,122, 124 are mounted onto each of wheels 126,128,130,132. The cameras 110,112 obtain images of the targets. These target images are processed in the data processing system 300, which calculates the orientation of each targets to the respective view paths. Data processing system 300 may also store values corresponding to the position of each detected image.

After the data processing system 300 acquires images of the targets, the vehicle is rolled back. The data processing system 300 again acquires a second set of images of the targets. The data processing system 300 then computes the angle through which the vehicle was rolled back, and determines the location of the wheel axis. Optionally, the vehicle can be rolled forward and the same measurement is conducted again as a check.

Alternatively, the wheel axis may be determined by using a precisely constructed target. The target is constructed in a way that the target patterns are concentric relative to a common center, which is also the center of the target. When the target assembly is attached to the wheel with claws, the wheel axis aligns with the center of the target. In addition, the target assembly is constructed in a way that when the target assembly is properly attached to the wheel of a vehicle, the distance between the target center and the center of the wheel, either the spindle or the wheel axis. The data processing system 300 has access to a database in which stores the distances between the target center and the point where the wheel axis penetrates the rim corresponding to different vehicle models.

When cameras 110, 112 form a viewing path with the target, based on the positions and shapes of the target patterns on the target, the data processing system 300 is able to determine the position of the target center, which aligns with the wheel axis or the extension thereof. Furthermore, the data processing system 300 can access the database to obtain the distance between the target center and the point where the wheel axis penetrates the rim, the position of the wheel axis can be determined.

Other methods for determining the position of the wheel center or the wheel axis known to people skilled in the art can also be implemented in the system 100 depending on design preference.

(2) Determination of the Reference Surface

In one embodiment, the reference plane is set as the ground plane on which the vehicle is positioned. After the positional characteristics of the wheel axis is determined, the position of the reference surface can be determined indirectly if the distance L between the reference plane and the center of the wheel is determined. The reference plane would then be a plane that is parallel to the lift on which the vehicle is placed and has a distance L from the center of the wheel.

Figure 5:
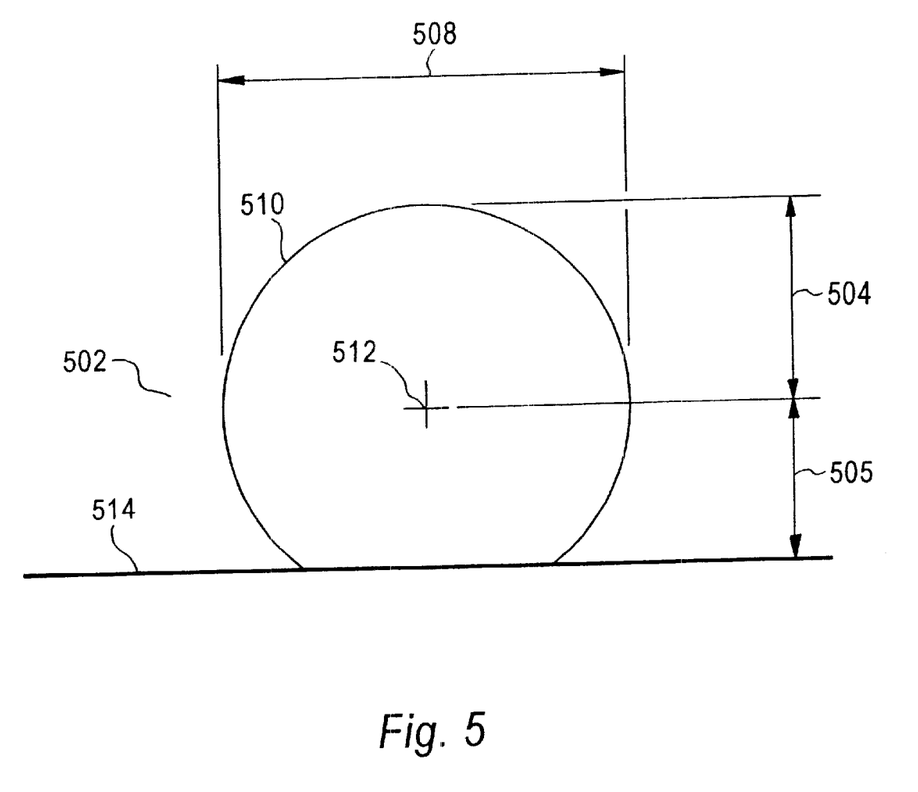
FIG. 5 shows a vehicle wheel with a wheel radius and roll radius.

However, the distance L between the center of the wheel and the reference plane is not equal to the wheel radius. FIG. 5 shows a vehicle wheel 502 that has a wheel radius 504 and roll radius 506. Wheel 502 generally has a constant wheel diameter 508 and is depicted in FIG. 5 at rest on a reference surface 514. The radius of the wheel 502 is defined as the distance between a wheel center 512 and the reference surface 510. Since the position of the wheel center is already known from the previous step, if the distance from the wheel center 512 to the reference surface 514 is also known, the position of the reference surface 514 can be determined.

The distance between the wheel center 512 and the reference surface 513, however, is not equal to half of the wheel diameter 508. The radius of the wheel varies depending on which point on the wheel surface 510 is selected for the measurement. Due to the weight of the vehicle, the tire deflects and flattens out against the surface 514. Furthermore, if the air pressure of the tire of wheel 502 is below the manufacturer specifications, the wheel 502 has a strong tendency to flatten out against surface 514 forming a large flat spot or contact area. Therefore, a measurement of the radius of wheel 502 from wheel center 512 to the bottom surface of the wheel 502, which is in contact with the reference surface 514, yields a roll radius 505 that is less than wheel radius 504. Therefore, in order to determine the precise position of the reference surface 514, the roll radius 505 needs to be calculated.

When determining the roll radius 505, wheel 502 can be considered as if it is a smaller circular wheel having a radius equal to roll radius 505. Roll radius 505 may be measured by rolling wheel 502 a short distance. Specifically, by determining the distance that the wheel has rolled and the angle through which the wheel has turned, roll radius 505 may be determined.

Figure 6A:
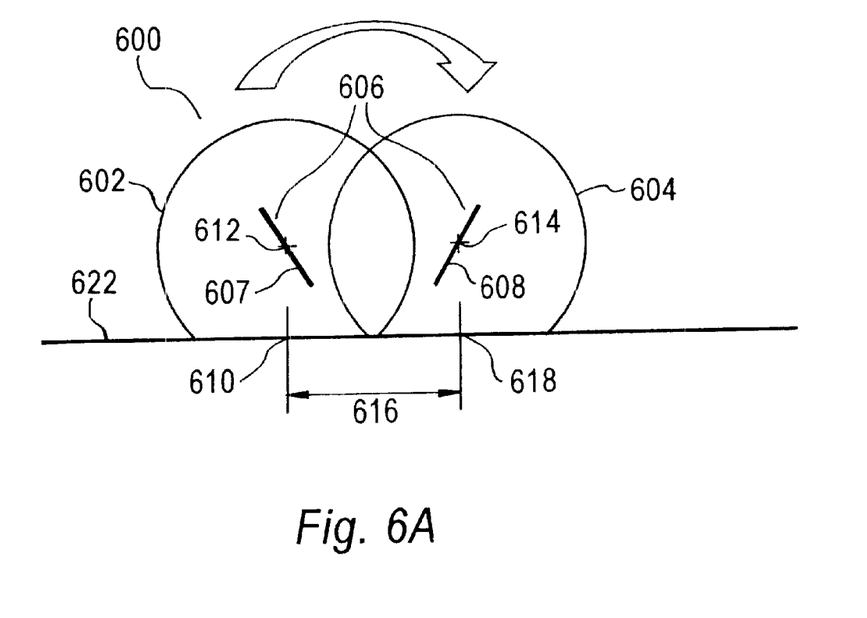
FIG. 6A depicts a vehicle wheel as it is rolled a short distance from an initial position to a final position.

FIG. 6A is a diagram of a vehicle wheel 600 as it is rolled a short distance from an initial position 602 on the left to a final position 604 on the right. Initial position 602 is characterized by an initial contact point 610 that is between the surface of the vehicle wheel 600 at initial position 602 and the reference surface 622 upon which the wheel 600 sits or rolls. Initial contact point 610 is directly below an initial position 612 of the wheel center. A target 606 may be attached to the wheel. Target 606 has initial orientation 607.

In FIG. 6A, final position 604 is characterized by a final contact point 618 that is between the surface of the wheel at the final position 604 and the reference surface 622. Final contact point 618 is directly below a final position 614 of the wheel center. Target 606 has final orientation 608.

Comparison of initial contact point 610 and final contact point 618 yields a measurement of a "distance traveled" 616 by wheel 600 as it is rolled. The distance traveled 616 is sometimes also referred to as the "distance traversed" or the "traversed distance." A typical distance traveled may be 6 inches to 3 feet.

Figure 6B:
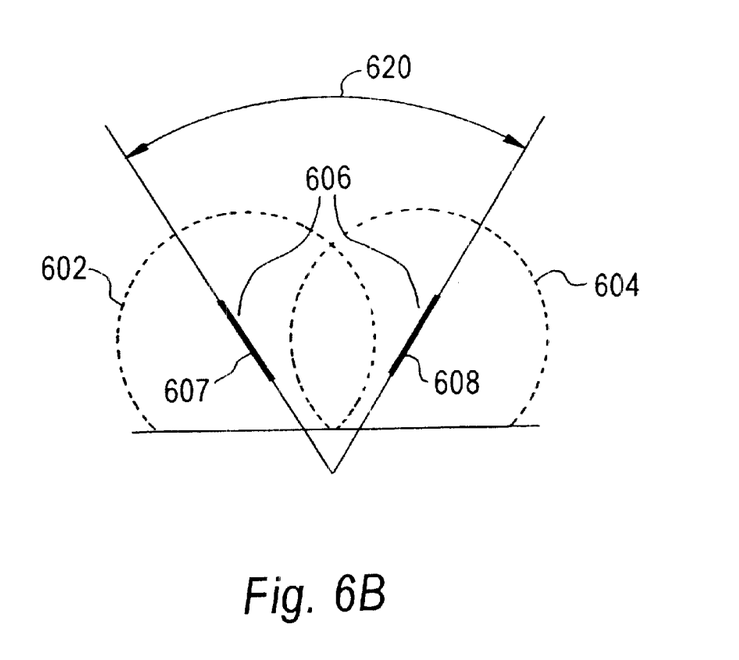
FIG. 6B shows an angle of rotation through which a vehicle wheel rolls from an initial position to a final position.

FIG. 6B is a diagram of an angle of rotation 620 through which a vehicle wheel rolls in moving from initial position 602 to final position 604. Comparison of initial orientation 607 of target 606 to final orientation 608 yields a measurement of the angle of rotation 620. The angle of rotation 620 is sometimes also referred to as the "angle of roll" or the "roll angle." An automatic machine vision system, under control of appropriate software, may be used to obtain position information for target 606, as described further below.

By obtaining values representing the distance traveled 616 and the angle of rotation 620, the roll radius of the wheel can be determined as follows:

The circumference of a circle is determined by the relationship:

$$C = 2\pi R \tag{1}$$

where C is the circumference of a circle, R is the circle's radius, and $\pi$ is the geometric constant pi.

If a circle is rotated through a given angle, the ratio of that angle in degrees, $\theta$, to a full rotation of 360 degrees is the same as the ratio of the partial circumference, P, that the circle rolled to the circle's full circumference, C. This relationship may be stated as follows:

$$\frac{\theta}{360} = \frac{P}{C} \tag{2}$$

Solving this expression for the circumference, C, yields:

$$C = \frac{360(P)}{\theta} \tag{3}$$

To find the circle's radius, R, the expression for the circumference, C, from Equation 3 is substituted into Equation 1 and solved for R. This yields the following relationship for the circle's radius:

$$R = \frac{360(P)}{2\pi\theta} \tag{4}$$

A similar expression may be written with other units for the angle of rotation. For example, if the angle of rotation were measured in radians, the constant "360°" in Equation 4 would be replaced by "$2\pi$."

Applying this relationship to a wheel that is rolled as illustrated in FIG. 6A, the partial circumference, P, is the distance traveled 616. The angle, $\theta$, is the angle of rotation 620. The radius, R, is roll radius 606 as shown in FIG. 6.

The system 100 determines the traveled distance 616 based on the changes on the target patterns when the wheel is rolled. Alternatively, the traveled distance 616 can be determined manually, such as using a measurement tape. The measured distance 616 may be entered into the data processing system 300 for calculating the roll radius. In another embodiment, the distance traveled may be measured by using a linear transducer. The linear transducer has an element that is attached to a fixed point on the vehicle and having a body secured to a stationary point on the alignment rack, the floor, or a wall. The distance traveled 616 is determined by the change in indications of the linear transducer as element moves from an initial position to a final position.

The angle of rotation 620 may be measured by mounting a gravity gauge to a wheel, such that the gravity gauge is parallel to the wheel plane. The signals obtained by the gravity gauge may be fed into the data processing system 300 with signal wires or be entered into the data processing system 300 manually. The wheel plane is an imaginary plane that is generally oriented vertically and parallel to the treads on the tire of the wheel. Therefore, a gravity gauge mounted parallel to the-wheel plane is rotated through the same angle of rotation as the wheel itself when the wheel is rolled. If an angular measurement from the gravity gauge is taken at the initial position of the wheel and also at the final position of the wheel, the difference between those two angular measurements yields the angle of rotation.

Gravity gauges that may be used include those in electronic alignment heads made by Snap-on and/or others. Typically, there are two gravity gauges in such alignment heads. The amount of wheel rotation may be measured by an angular encoding device, placed between the measurement head and the mounting apparatus attaching the head of the wheel if the head is free to rotate and remain level as the wheel is rolled. Alternatively, if the head is locked to the wheel, the caster inclinometer may be used to measure the wheel rotation.

The angle of rotation may also be measured manually by a technician. The resulting measurement of the angle of rotation may then be input to the data processing system 300 for further processing.

Figure 7A:
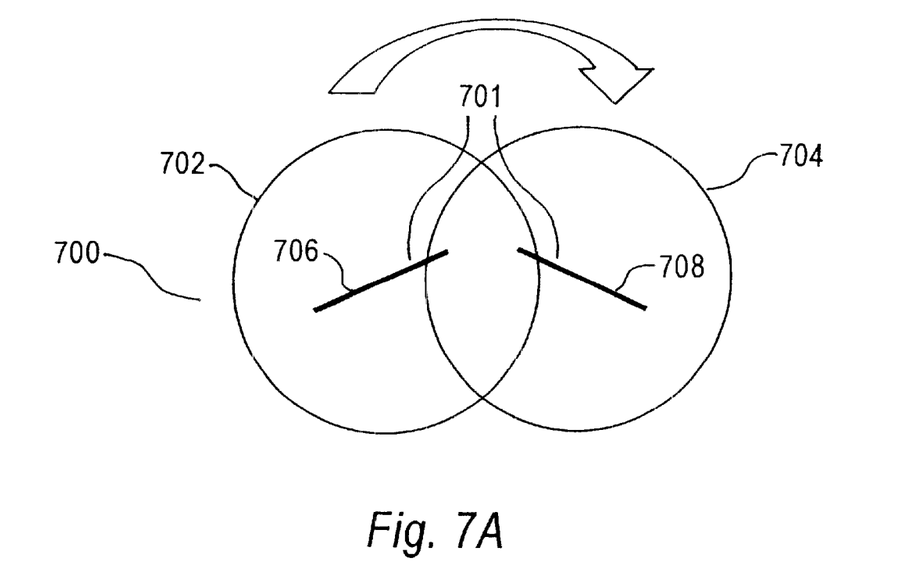
FIGS. 7A and 7B show a wheel with a gravity gauge in an initial position and a final position.
Figure 7B:
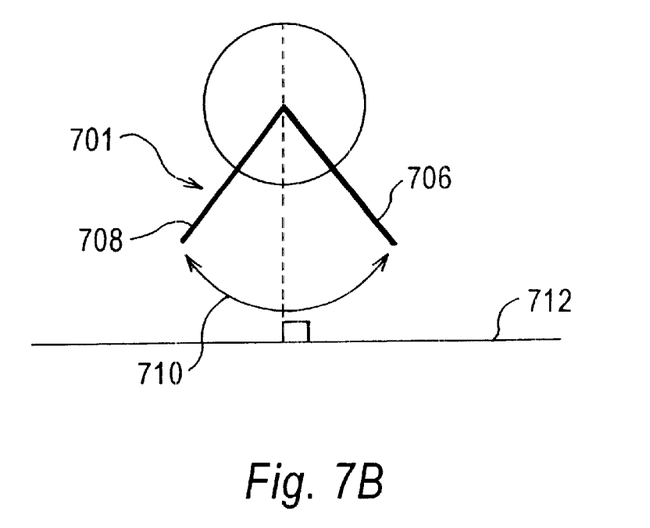

FIGS. 7A and 7B illustrate the process of using a gravity gauge to measure roll radius. A wheel 700 has an initial position 702. A gravity gauge 701 is also shown in an initial position 706. When wheel 700 is rolled into a final position 704, gravity gauge 701 is in a final position 708. FIG. 7B is a simplified diagram of gravity gauge 701 in initial position 706 and final position 708. As shown, the angle of rotation 77 is the difference between initial position 706 and final position 708 of gravity gauge 701. At rest, gauge 701 is normal to plane 712.

After the data processing system 300 obtains signals representing the distance rolled and the rotation angle, based on equation (4), the data processing system determines roll radius 606 of wheel 602.

Alternatively, the roll radius may be measured manually by the alignment technician using a measurement tape or the equivalent to determine the distance between the center of the wheel and the point on the outer edge of the wheel directly beneath the center of the wheel. This roll radius measurement may then be input to the alignment system 300. Other details of calculating a roll radius can be found in U.S. Pat. No. 6,237,234, titled "Method and Apparatus for Measuring Vehicle Wheel Roll Radius," assigned to the same assignee of the current application, which is incorporated herein by reference.

After both the wheel center and the reference plane are determined, as shown in FIG. 2, the data processing system 300 sets up a Cartesian coordinate system having three axes, x, y and z, wherein the x-y plane is set as the reference plane, which is the ground surface 16 in the example, the origin of the coordinate system is set as the y-axis projection of the wheel center 19 on the ground surface 16, and the z-axis is set as orthogonal to the x-y plane passing through the origin.

(3) Determination of the Spatial Characteristics of the Steering Axis

After the coordinate system is set up, the caster trail, as previously discussed in FIG. 2, is the distance between the origin and the y-axis projection of the intersection of the steering axis 14 and the ground surface 16. The y-axis projection of the intersection of the steering axis 14 and the ground surface 16 can be determined by obtaining the caster value of the wheel.

Referring to FIGS. 1 and 2, the y-axis projection of the intersection of the steering axis 14 and the ground surface 16 can be determined by obtaining the caster value of the wheel. When the caster value of the wheel is determined, a vector V representing the projection of the steering axis 14 on the y-z plane can be determined, just as the steering axis 14 shown in FIG. 1. Once the vector V is determined, the intersection 32 of vector V and the y-axis can be determined. The distance between the intersection 32 and the origin of the coordinate system is the caster trail.

When using the system 100 to determine the caster value of the vehicle, the vehicle under test is driven onto lift 140 such that the vehicle in as central a position as possible between two cameras 110, 112. The targets, especially the targets attached to the steerable wheels, are mounted in a manner that would minimise the effects of targets being viewed at a steep angle to the cameras. The caster angle of the wheel can be determined based on two camber measurements that are taken when the wheel is turn to a small angle, such as 10 degrees, relative to the thrust line of the vehicle, and then turned to the other direction relative to the thrust line in an identical angle. Detailed descriptions of calculating cater values using optical cameras are provided in, for example, an SAE publication No. 850219, titled "Steering Geometry and Caster Measurement," which is an industry standard in measuring caster values. Other well-known methods in obtaining caster values, if desired, can also be implemented on the system 100.

Once the caster value is obtained, a vector V representing the projection of the steering axis on the y-z plane can be determined, just as the steering axis 14 shown in FIG. 1.

Alternatively, the spatial characteristics of steering axis 14 can be determined using an inclinometer, as is known in the art. The reading can be manually entered or automatically fed to the data processing system 300. Other methods known to people skilled in the art to determine the steering axis can also be used to provide information to the data processing system 300 to determine caster trail.

After the spatial characteristics of the steering axis, the wheel center and the reference plane in the coordinate system is determined, the caster trail of the vehicle can be determined according to the method described earlier.

(4) Determination of Caster Trail Using Alternative Definition

As discussed earlier, caster trail can also be defined as the fore and aft distance between the wheel center and the intersection of the steering axis and a reference plane that is at the height of the wheel center 19 and parallel to the ground plane 16. The only difference between the previous definition and the alternative definition is that the reference planes used in the definitions are different. In the previous definition, the reference plane is the ground plane on which the wheel is placed, while in the alternative definition, the reference plane is elevated to the height of the wheel center.

In calculating caster trail using the alternative definition, similar to the first embodiment, the data processing system 300 sets up a Cartesian coordinate system having three axes, x, y and z, wherein the x-y plane is set as a plane parallel to the ground surface 16. The origin of the coordinate system is set at the center of the wheel, and the z-axis passing through the origin and orthogonal to the x-y plane. The system then determines the steering axis in ways similar to those described in the first embodiment. The y-axis projection of the intersection of the steering axis 14 and the reference surface can be determined by obtaining the caster value of the wheel in ways similar to those described in the first embodiment. After the caster value of the wheel is determined, a vector V representing the projection of the steering axis 14 on the y-z plane can be determined. Once the vector V is determined, the intersection of vector V and the y-axis can be determined. The distance between the intersection and the origin of the coordinate system is the caster trail under the alternative definition.

Diagnostic Process

Once the caster trail is determined, the data processing system 300 presents the determined value on the display unit 512 for evaluation. The technician can use such results to help diagnose the condition of the vehicle, such as the vehicle suspension, the wheels, and/or the like. Optionally, the data processing system 300 is programmed to compare the resulting values for each wheel.

According to one embodiment, the data processing system 300 compares the measured caster trail with the caster trail values specified by vehicle manufacturers. The data processing system 300 may access information related to the manufacturer's specified caster trail stored in a remote server via a data transmission network, such as the internet. According to another embodiment, the data processing system 300 sends the measured caster trail to a remote server via a data transmission network to be compared with specification values.

Furthermore, individual caster trail measurements may be compared to a predetermined value, a predetermined range of values, or manufacturing specifications. The data processing system 300 can highlight any measured caster trail values that fall outside those specified tolerances, such as by generating a warning message to alert the alignment technician. A warning to investigate wheel pull problems might be provided if the caster trail of the front wheels do not match.

Determination of Scrub Radius

Optionally, the same system 100 may also include a function to measure the scrub radius of the wheel. Detailed descriptions for measuring the scrub radius of the wheel are disclosed in a co-pending U.S. Pat. application Ser. No. 09/892,722 by Jackson et al. and titled "METHOD AND APPARATUS FOR MEASURING VEHICLE WHEEL SCRUB RADIUS," the entirety of which is incorporated herein by reference.

Once the system obtains both the caster trail and the scrub radius of the wheel, the system may display the results on a display of the system, either graphically or numerically or both. The system may further access specifications of caster trail and scrub radius of the vehicle under test. The system then displays the measurement results concurrently with specifications of caster trail and scrub radius of the vehicle under test, either graphically or numerically or both, such that the operator can observe the differences between the measurements and specifications.

The Data Processing System

Figure 8:
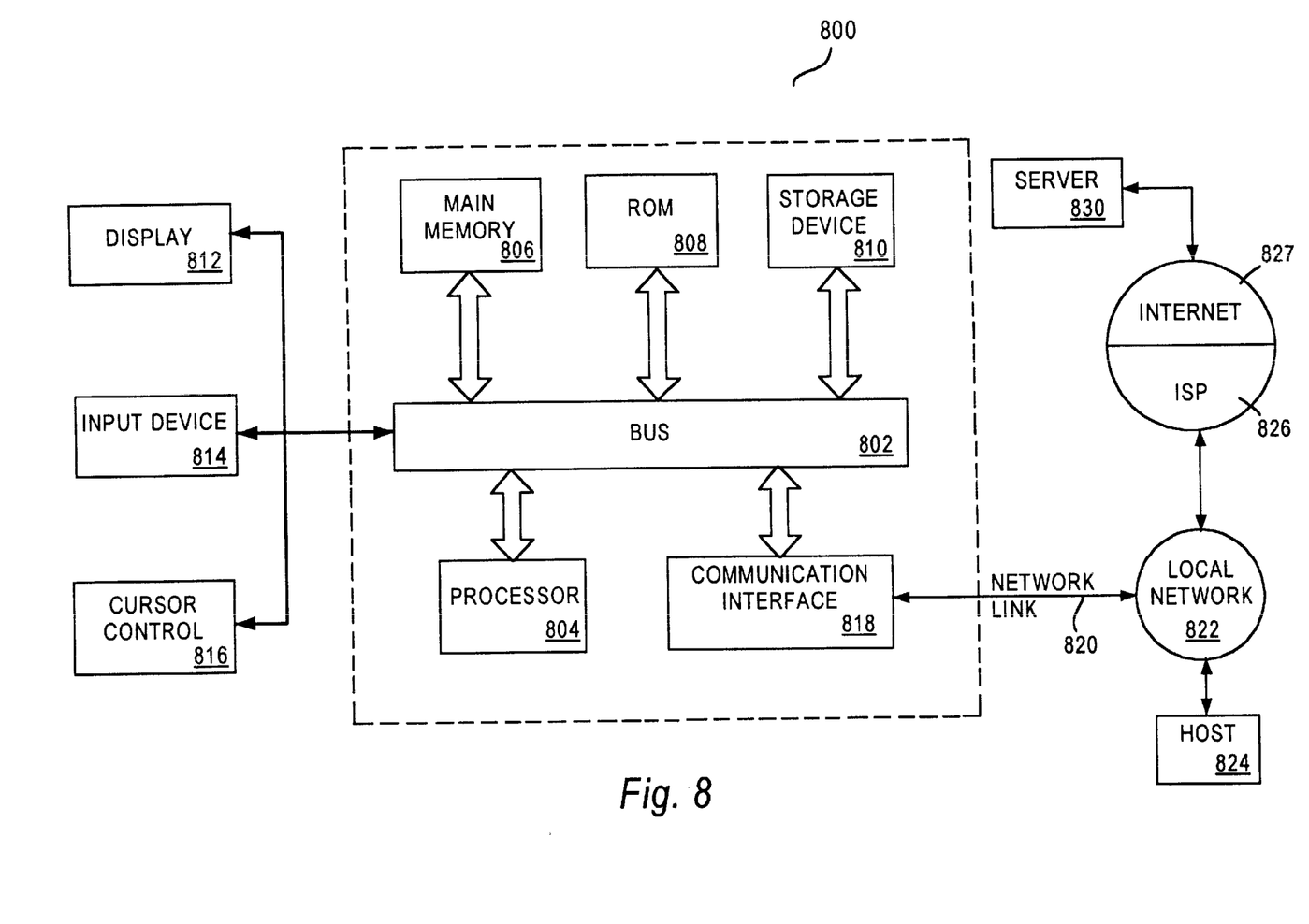
FIG. 8 is a block diagram of an exemplary data processing system upon which an embodiment of the disclosure may be implemented.

The data processing system 300, as described earlier, conducts numerous tasks, such as determining processing positional signals, calculating relative positions, providing a user interface to the operator, displaying alignment instructions and results, receiving commands from the operator, sending control signals to rotate the alignment cameras, etc. FIG. 8 is a block diagram that illustrates an exemplary data processing system 300 upon which an embodiment of the disclosure may be implemented.

Data processing system 300 includes a bus 802 or other communication mechanism for communicating information, and a processor 804 coupled with bus 802 for processing information. Data processing system 300 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Data processing system 300 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Data processing system 300 may be coupled via bus 802 to a display 812, such as a cathode ray tube (CRT), for displaying information to an operator. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812.

The data processing system 300 is controlled in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a data processing system can read.

Various forms of machine-readable media may be involved in carrying one or more sequences of one or more instructions to processor 804 for execution. For example, the instructions may initially be carried on a magnetic disk of a remote data processing. The remote data processing system can load the instructions into its dynamic memory and send the instructions over a telephone line using a modem. A modem local to data processing system 300 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Data processing system 300 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host data processing system 824 or to data equipment operated by an Internet Service Provider (ISP) 826. ISP 826 in turn provides data communication services through the world large packet data communication network now commonly referred to as the "Internet" 827. Local network 822 and Internet 827 both use electrical, electromagnetic or optical signals that carry digital data streams. The signals through the various networks and the signals on network link 820 and through communication interface 818, which carry the digital data to and from data processing system 300, are exemplary forms of carrier waves transporting the information.

Data processing system 300 can send messages and receive data, including program code, through the network (s), network link 820 and communication interface 818. In the Internet example, a server 830 might transmit a requested code for an application program through Internet 827, ISP 826, local network 822 and communication interface 812. In accordance with embodiments of the disclosure, one such downloaded application provides for automatic calibration of an aligner as described herein.

The data processing also has various signal input/output ports (not shown in the drawing) for connecting to and communicating with peripheral devices, such as USB port, PS/2 port, serial port, parallel port, IEEE-1394 port, infra red communication port, etc., or other proprietary ports. The measurement modules may communicate with the data processing system via such signal input/output ports.

The disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than a restrictive sense.

What is claimed is:

1. A method for measuring caster trail of a wheel comprising the machine-implemented steps of:

determining spatial characteristics of a steering axis of the wheel;

determining spatial characteristics of a reference plane;

determining spatial characteristics of a wheel center; and determining the caster trail of the wheel based on the spatial characteristics of the steering axis, the reference plane and the wheel center.

2. The method of claim 1, wherein the spatial characteristics of the wheel center are determined based on spatial characteristics of a wheel axis.

3. The method of claim 2 further comprising the machine-implemented step of determining an intersection of the reference plane and the steering axis or an extension thereof.

4. The method of claim 3, wherein the caster trail is determined based on a distance between the projection of the wheel axis on the reference plane and the intersection of the steering axis and the reference plane.

5. The method of claim 1, wherein the step of determining the spatial characteristics of the reference plane includes the machine-implemented steps of:

receiving data related to a roll radius of the wheel; and determining the reference plane based on the wheel center and the roll radius.

6. The method of claim 1 further comprising a step of comparing the caster trail with specifications.

7. The method of claim 1, wherein the step of determining the spatial characteristics of the steering axis includes the machine-implemented steps of:

obtaining positional parameters of the wheel when steering the wheel between the first and the second positions; and determining the spatial characteristics of the steering axis based on the positional parameters.

8. The method of claim 1, wherein the reference plane is the plane on which the wheel is positioned.

9. The method of claim 1, wherein the reference plane is a plane passing the wheel center and parallel to the plane on which the wheel is positioned.

10. A system for measuring caster trail of a wheel, comprising:

position sensing devices for sensing positional signals of the wheel; and a data processing system configured to couple to the position sensing devices, the data processing system including:

a data port for receiving the positional signals from the position sensing devices;

a data processor coupled to the data port for processing data; and a data storage device coupled to the data processor for storing instructions upon execution by the data processor causing the data processing system to perform the machine-implemented steps of:

determining spatial characteristics of a steering axis of the wheel based on the positional signals;

determining spatial characteristics of a reference plane based on the positional signals;

determining spatial characteristics of a wheel center based on the positional signals; and determining the caster trail of the wheel based on the spatial characteristics of the steering axis, the reference plane and the wheel center.

11. The system of claim 10, wherein the spatial characteristics of the wheel center are determined based on spatial characteristics of a wheel axis.

12. The system of claim 11, wherein the data storage device further includes instructions upon execution by the data processor causing the data processing system to determine an intersection of the reference plane and the steering axis or an extension thereof.

13. The system of claim 12, wherein the caster trail is determined based on a distance between the projection of the wheel axis on the reference plane and the intersection of the steering axis and the reference plane.

14. The system of claim 10, wherein the position sensing devices include at least one optical imaging device for forming a viewing path with a target attached to the wheel.

15. The system of claim 14, wherein the at least one optical imaging device includes a video camera.

16. The system of claim 14, wherein the at least one optical imaging device includes a light sensor.

17. The system of claim 10, wherein the step of determining the spatial characteristics of the steering axis includes the machine-implemented steps of:
receiving a first positional signal representing a first positional parameter of the wheel when the wheel is positioned to a first direction;
receiving a second positional signal representing a second positional parameter of the wheel when the wheel is positioned to a second direction; and
determining a caster value for the wheel based on the first and second positional signals.

18. The system of claim 10, wherein the step of determining the spatial characteristics of the reference plane includes the machine-implemented steps of:
receiving data related to a roll radius of the wheel; and
determining the reference plane based on the wheel center and the roll radius.

19. The system of claim 18, wherein the step of determining the roll radius of the wheel includes the machine-implemented steps of:
receiving a signal representing a rotation angle when the wheel is rolled from a first position to a second position;
receiving a signal representing the distance when the wheel rolled from the first position to the second position; and
determining the roll radius based on the rotation angle and the distance.

20. The system of claim 10, wherein the data storage device further includes instructions upon execution by the data processor causing the data processing system to perform the machine-implemented steps of:
accessing data related to caster trail specifications; and
determining an operational status of the wheel based on the caster trail of the wheel and the caster trail specifications.

21. The system of claim 20 further comprising a display coupled to the data processor and the data storage device, wherein the data storage device further includes instructions upon execution by the data processor causing the data processing system to perform the machine-implemented step of displaying a graphic representation of the caster specifications and the caster trail of the wheel on the display.

22. The system of claim 20 further comprising a display coupled to the data processor and the data storage device, wherein the data storage device further includes instructions upon execution by the data processor causing the data processing system to perform the machine-implemented step of displaying a numeric representation of the caster specifications and the caster trail of the wheel on the display.

23. The system of claim 10, wherein the data storage device further includes instructions upon execution by the data processor causing the data processing system to perform the machine-implemented step of determining a scrub radius of the wheel.

24. The system of claim 23, further comprising a display coupled to the data processor and the data storage device, wherein the data storage device further includes instructions upon execution by the data processor causing the data processing system to perform the machine-implemented steps of displaying a numeric representation of the caster trail and the scrub radius of the wheel on the display.

25. The system of claim 23 further comprising a display coupled to the data processor and the data storage device, wherein the data storage device further includes instructions upon execution by the data processor causing the data processing system to perform the machine-implemented steps of:
accessing data related to caster trail specifications and scrub radius specifications; and
displaying graphical representations of the caster trail, the scrub radius, caster trail specifications and scrub radius specifications.

26. The system of claim 10, wherein the reference plane is the plane on which the wheel is positioned.

27. The system of claim 10, wherein the reference plane is a plane passing the wheel center and parallel to the plane on which the wheel is positioned.

28. A data processing system configured to use with position sensing devices to measure caster trail of a wheel, wherein the position sensing devices are configured to sense positional signals of the wheel, the data processing system comprising:
a data port for receiving the positional signals;
a data processor for processing data; and
a data storage device coupled to the data processor for storing instructions upon execution by the data processor causing the data processing system to perform the machine-implemented steps of:
determining spatial characteristics of a steering axis of the wheel based on the positional signals;
determining spatial characteristics of a reference plane based on the positional signals;
determining spatial characteristics of a wheel center based on the positional signals; and
determining the caster trail of the wheel based on the spatial characteristics of the steering axis, the reference plane and the wheel center.

29. The system of claim 28, wherein the spatial characteristics of the wheel center are determined based on spatial characteristics of a wheel axis.

30. The data processing system of claim 29, wherein the data storage device further includes instructions upon execution by the data processor causing the data processing system to determine an intersection of the reference plane and the steering axis or an extension thereof.

31. The data processing system of claim 30, wherein the caster trail is determined based on a distance between the projection of the wheel axis on the reference plane and the intersection.

32. The system of claim 28, wherein step of determining the spatial characteristics of the steering axis includes the machine-implemented steps of:
receiving a first positional signal representing a first positional parameter of the wheel when the wheel is positioned at a first direction;
receiving a second positional signal representing a second positional parameter of the wheel when the wheel is positioned at a second direction; and
determining a caster value for the wheel based on the first and second positional signals.

33. The system of claim 28, wherein the data storage device further includes instructions upon execution by the data processor causing the data processing system to perform the machine-implemented steps of:
accessing data related to caster trail specifications; and
determining an operational status of the wheel based on the caster trail of the wheel and the caster trail specifications.

34. The system of claim 28, wherein the reference plane is the plane on which the wheel is positioned.

35. The system of claim 28, wherein the reference plane is a plane passing the wheel center and parallel to the plane on which the wheel is positioned.

36. A machine-readable medium bearing instructions for controlling a data processing system for use with position sensing devices to determine a caster trail of a wheel, wherein the position sensing devices are configured to sense positional signals of the wheel, the instructions upon execution by the data processing system causing the data processing system to perform the steps of:

determining spatial characteristics of a steering axis of the wheel based on the positional signals;
  determining spatial characteristics of a reference plane based on the positional signals;
  determining spatial characteristics of a wheel center based on the positional signals; and
  determining the caster trail of the wheel based on the spatial characteristics of the steering axis, the reference plane and the wheel center.

37. The system of claim 36, wherein the spatial characteristics of the wheel center are determined based on spatial characteristics of a wheel axis.

38. The machine-readable medium of claim 37 further comprising instructions, upon execution by the data processing system, causing the data processing system to determine an intersection between the reference plane and the steering axis or an extension thereof.

39. The machine-readable medium of claim 38, wherein the caster trail is determined based on a distance between the projection of the wheel axis on the reference plane and the intersection of the steering axis and the reference plane.

40. The machine-readable medium of claim 36 further comprising instructions, upon execution by the data processing system, causing the data processing system to compare the caster trail with specifications.

41. The machine-readable medium of claim 36, wherein step of determining the spatial characteristics of the steering axis includes the machine-implemented steps of:

receiving a first positional signal representing a first positional parameter of the wheel when the wheel is positioned to a first direction;
  receiving a second positional signal representing a second positional parameter of the wheel when the wheel is positioned to a second direction; and
  determining a caster value for the wheel based on the first and second positional signals.

42. The machine-readable medium of claim 36 further comprising instructions upon execution by the data processing system causing the data processing system to perform the machine-implemented steps of:

accessing data related to caster trail specifications; and
  determining an operational status of the wheel based on the caster trail of the wheel and the caster trail specifications.

43. The machine-readable medium of claim 36, wherein the reference plane is the plane on which the wheel is positioned.

44. The machine-readable medium of claim 36, wherein the reference plane is a plane passing the wheel center and parallel to the plane on which the wheel is positioned.

45. A system for measuring caster trail of a wheel, comprising:

position sensing means for sensing positional signals of the wheel; and
  data processing system configured to couple to the position sensing devices, the data processing system including:
    data port means for receiving the positional signals from the position sensing devices;
    data processing means for processing data; and
    data storage means coupled to the data processor for storing instructions upon execution by the data processor causing the data processing system to perform the machine-implemented steps of:
      determining spatial characteristics of a steering axis of the wheel based on the positional signals;
      determining spatial characteristics of a reference plane based on the positional signals;
      determining spatial characteristics of a wheel center based on the positional signals; and
      determining the caster trail of the wheel based on the spatial characteristics of the steering axis, the reference plane and the wheel center.

46. The system of claim 45, wherein the spatial characteristics of the wheel center are determined based on spatial characteristics of a wheel axis.

47. The system of claim 46, wherein the data storage means further includes instructions upon execution by the data processing means causing the data processing system to determine an intersection of the reference plane and the steering axis or an extension thereof.

48. The system of claim 47, wherein the caster trail is determined based on a distance between the projection of the wheel axis on the reference plane and the intersection of the steering axis and the reference plane.

49. The system of claim 48, wherein the position sensing means include optical imaging devices for forming a viewing path with a target attached to the wheel.

50. The system of claim 49, wherein the optical imaging devices include at least one video camera.

51. The system of claim 45, wherein the data storage means further includes instructions upon execution by the data processing means causing the data processing system to perform the machine-implemented steps of:

accessing data related to caster trail specifications; and
  determining an operational status of the wheel based on the caster trail of the wheel and the caster trail specifications.

52. A data processing system configured to determine caster trail of a wheel, comprising:

an input device for receiving data related to positional parameters of the wheel;
  a data processor coupled to the input device for processing data; and
  a data storage device coupled to the data processor for storing instructions upon execution by the data processor causing the data processing system to perform the machine-implemented steps of:
    determining spatial characteristics of a steering axis of the wheel based on the positional parameters;
    determining spatial characteristics of a reference plane based on the positional parameters;
    determining spatial characteristics of a wheel center based on the positional parameters; and
    determining the caster trail of the wheel based on the spatial characteristics of the steering axis, the reference plane and the wheel center.

53. The system of claim 52, wherein the spatial characteristics of the wheel center are determined based on spatial characteristics of a wheel axis.

54. The data processing system of claim 52, wherein the input device includes at least one of the following: a keyboard, a touch screen input device, a cursor control device and a data transmission port.

55. The data processing system of claim 54, wherein the data storage device further includes instructions upon execution by the data processor causing the data processing system to determine an intersection of the reference plane and the steering axis or an extension thereof.

56. The data processing system of claim 52, wherein the data is input to the system manually.

57. The data processing system of claim 55, wherein the caster trail is determined based on a distance between the projection of the wheel axis on the reference plane and the intersection of the steering axis and the reference plane.

58. The system of claim 52, wherein the data storage device further includes instructions upon execution by the data processor causing the data processing system to perform the machine-implemented steps of:
   accessing data related to caster trail specifications; and
   determining an operational status of the wheel based on the caster trail of the wheel and the caster trail specifications.

59. A data processing system configured to use with a vision imager that detects a first image when the wheel is in a first position and a second image when the wheel is in a second position, the data processing system comprising:
   a data port configured to couple to the vision imager for receiving signals therefrom;
   a data processor for processing data; and
   a data storage device coupled to the data processor for storing instructions upon execution by the data processor causing the data processing system to determine the caster trail of the wheel based on signals representing the first image and the second image.

60. The data processing system of claim 59, wherein the data storage device further includes instructions upon execution by the data processor causing the data processing system to perform the machine-implemented steps of:
   receiving positional signals related the wheel;
   determining positional characteristics of the steering axis, the reference plane and a projection of a wheel axis on the reference plane; and
   determining an intersection of the reference plane and the steering axis or an extension thereof.

61. A data processing system configured to use with position sensing devices to determine caster trail of a wheel, wherein the position sensing devices are configured to detect positional signals of the wheel, the data processing system comprising:
   a data port configured for receiving the positional signals;
   a data processor coupled to the data port for processing data; and
   a data storage device coupled to the data processor for storing instructions upon execution by the data processor causing the data processing system to perform the machine-implemented steps of:
   calculating a caster value of the wheel based on the positional signals;
   determining spatial characteristics of a reference plane and a wheel center based on the positional signals; and
   determining the caster trail based on the caster value and the spatial characteristics of the reference plane and the wheel center.

62. A data processing system configured to use with position sensing devices to determine caster trail of a wheel, wherein the position sensing device are configured to detect positional signals of the wheel, the data processing system comprising:
   a data port configured for receiving the positional signals;
   a data processor for processing data; and
   a data storage device coupled to the data processor and the data port for storing instructions upon execution by the data processor causing the data processing system to perform the machine-implemented steps of:
   determining spatial characteristics of a side wheel centerline, a reference plane and a steering axis based on the positional signals; and
   determining the caster trail based on the spatial characteristics of the side wheel centerline, the reference plane and the steering axis.

63. A data processing system configured to determine caster trail of a wheel comprising:
   an input device for receiving data related to positional parameters of the wheel;
   a data processor for processing data; and
   a data storage device coupled to the data processor for storing instructions upon execution by the data processor causing the data processing system to perform the machine-implemented steps of:
   determining spatial characteristics of a side wheel centerline, a reference plane and a steering axis based on the positional parameters; and
   determining the caster trail based on the spatial characteristics of the side wheel centerline, the reference plane and the steering axis.

64. A data processing system configured to use with position sensing devices to determine a caster trail of a wheel, wherein the position sensing devices are configured to sense positional signals of the wheel, the system comprising:
   an input device for receiving data related to positional parameters of the wheel;
   an input port for receiving the positional signals;
   a data processor coupled to the input device for processing data; and
   a data storage device coupled to the data processor for storing instructions upon execution by the data processor causing the data processing system to perform the machine-implemented steps of:
   determining spatial characteristics of a steering axis of the wheel based on at least one of the positional parameters and the positional signals;
   determining spatial characteristics of a reference plane based on at least one of the positional parameters and the positional signals;
   determining spatial characteristics of a wheel center based on at least one of the positional parameters and the positional signals; and
   determining the caster trail of the wheel based on the spatial characteristics of the steering axis, the reference plane and the wheel center.

65. The system of claim 64, wherein the spatial characteristics of the wheel center are determined based on spatial characteristics of a wheel axis.

66. The data processing system of claim 64, wherein the input device includes at least one of the following: a keyboard, a touch screen input device, and a data transmission port.

67. The data processing system of claim 66, wherein the data storage device further includes instructions upon execution by the data processor causing the data processing system to determine an intersection of the reference plane and the steering axis or an extension thereof.

68. The data processing system of claim 64, wherein the data is obtained manually.

69. The data processing system of claim 67, wherein the caster trail is determined based on a distance between the projection of the wheel axis on the reference plane and the intersection of the steering axis and the reference plane.

70. The system of claim 64, wherein the data storage device further includes instructions upon execution by the data processor causing the data processing system to perform the machine-implemented steps of:

accessing data related to caster trail specifications; and determining an operational status of the wheel based on the caster trail of the wheel and the caster trail specifications.

71. A system for measuring caster trail of a wheel, comprising:

position sensing devices for sensing positional signals of the wheel; and a data processing system configured to couple to the position sensing devices, the data processing system including:

a data port for receiving the positional signals from the position sensing devices;

an input device for receiving data related to positional parameters of the wheel;

a data processor coupled to the data port for processing data; and a data storage device coupled to the data processor for storing instructions upon execution by the data processor causing the data processing system to perform the machine-implemented steps of:

determining spatial characteristics of a steering axis of the wheel based on at least one of the positional signals and the positional parameters;

determining spatial characteristics of a reference plane based on at least one of the positional signals and the positional parameters;

determining spatial characteristics of a wheel center based on at least one of the positional signals and the positional parameters; and determining the caster trail of the wheel based on the spatial characteristics of the steering axis, the reference plane and the wheel center.

72. The system of claim 71, wherein the data is obtained manually.

* * * * *